United States Patent
Basson et al.

(10) Patent No.: US 11,195,544 B2
(45) Date of Patent: *Dec. 7, 2021

(54) COMPUTERIZED TOOL FOR CREATING VARIABLE LENGTH PRESENTATIONS

(71) Applicant: International Business Machines Corporation, Armonk, NY (US)

(72) Inventors: Sara H. Basson, White Plains, NY (US); Michael Bender, Rye Brook, NY (US); David J. Delia, Lagrangeville, NY (US); Wayne M. Delia, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/423,223

(22) Filed: May 28, 2019

(65) Prior Publication Data

US 2019/0295565 A1    Sep. 26, 2019

Related U.S. Application Data

(63) Continuation of application No. 14/526,769, filed on Oct. 29, 2014, now Pat. No. 10,360,925.

(51) Int. Cl.

| | | |
|---|---|---|
| *G10L 25/27* | (2013.01) | |
| *G10L 25/57* | (2013.01) | |
| *G10L 21/16* | (2013.01) | |
| *G06F 3/048* | (2013.01) | |
| *G06F 3/0484* | (2013.01) | |
| *G06Q 10/10* | (2012.01) | |

(52) U.S. Cl.
CPC .............. *G10L 25/27* (2013.01); *G06F 3/048* (2013.01); *G06F 3/0484* (2013.01); *G06F 3/04842* (2013.01); *G06Q 10/10* (2013.01); *G10L 21/16* (2013.01); *G10L 25/57* (2013.01)

(58) Field of Classification Search
CPC ... G06Q 10/10; G06F 16/4393; G06F 40/103; G09B 5/02; G09B 5/06; G09B 5/067
See application file for complete search history.

(56) References Cited

U.S. PATENT DOCUMENTS

| | | | |
|---|---|---|---|
| 5,917,480 | A | 6/1999 | Tafoya et al. |
| 7,665,021 | B2 | 2/2010 | Randall et al. |
| 7,930,637 | B2 | 4/2011 | Miller et al. |
| 7,945,857 | B2 | 5/2011 | Deutscher et al. |
| 8,326,835 | B1 * | 12/2012 | Munter ................. G06F 16/904 707/737 |

(Continued)

OTHER PUBLICATIONS

R. Araujo et al., "Personalization of Interactive Digital Media in Ubiquitous Educational Environments," 2013 IEEE International Conference on Systems, Man, and Cybernetics, pp. 3955-3960 (2013).

(Continued)

*Primary Examiner* — Tan H Tran
(74) *Attorney, Agent, or Firm* — Scott S. Dobson

(57) ABSTRACT

A computer based tool and method for automatically producing, from an existing presentation, a new presentation that fits within a specific presentation duration based on the priority associated with each element within the existing presentation and the presentation time for each individual element.

13 Claims, 6 Drawing Sheets

(56) References Cited

U.S. PATENT DOCUMENTS

| | | | |
|---|---|---|---|
| 8,345,050 B2 | 1/2013 | Goldhor et al. | |
| 8,687,946 B2 | 4/2014 | Sathish et al. | |
| 8,739,017 B2 | 5/2014 | Glazer et al. | |
| 2005/0071737 A1 | 3/2005 | Adendorff et al. | |
| 2006/0020895 A1* | 1/2006 | Keohane | G09B 5/02 715/732 |
| 2007/0168365 A1* | 7/2007 | Chai | G06F 16/10 |
| 2008/0288864 A1* | 11/2008 | Qu | G06F 16/4393 715/273 |
| 2009/0327897 A1 | 12/2009 | Serpigo et al. | |
| 2010/0114991 A1 | 5/2010 | Chaudhary et al. | |
| 2010/0142833 A1* | 6/2010 | Ishizawa | G06F 3/0482 382/224 |
| 2011/0288861 A1* | 11/2011 | Kurzweil | G09B 5/06 704/235 |
| 2012/0137211 A1 | 5/2012 | Lewontin | |
| 2012/0173984 A1 | 7/2012 | Deluca et al. | |
| 2013/0024772 A1 | 1/2013 | Delia et al. | |
| 2013/0124984 A1 | 5/2013 | Kuspa | |
| 2013/0167033 A1* | 6/2013 | Skwarecki | G11B 27/034 715/719 |
| 2013/0198692 A1 | 8/2013 | Lin | |
| 2013/0346843 A1 | 12/2013 | Murray et al. | |
| 2015/0132735 A1* | 5/2015 | Edge | G06Q 10/10 434/308 |
| 2015/0370768 A1* | 12/2015 | Tigchelaar | G06F 40/166 715/254 |
| 2016/0124909 A1 | 5/2016 | Basson et al. | |

OTHER PUBLICATIONS

IP.com, "Business analytics real-time data display using a slide deck presentation widget," IP.com No. IPCOM000224858D (Jan. 8, 2013), 8 pages.

C. Keramane et al., "Interval Expressions—a Functional Model for Interactive Dynamic Multimedia Presentations," Proceedings of Multimedia '96, pp. 283-286 (1996).

"Auto Summarize—Microsoft Office Support," http://msofficesupport.blogspot.com/2011/05/auto-summarize.html (2011), 5 pages.

List of IBM Patents or Patent Applications Treated as Related, dated May 24, 2019, 2 pages.

* cited by examiner

COMPUTERIZED TOOL FOR CREATING VARIABLE LENGTH PRESENTATIONS

FIELD OF THE INVENTION

This disclosure relates generally to computerized tools and, more particularly, to a computerized tool automatically producing new presentations from existing presentations.

BACKGROUND

Business presentations are often subject to very strict time limits in meeting agendas. Not only are strict time limits often specified for a presentation, but often a presentation that was originally allowed a certain time frame, for example 30 minutes, may need to subsequently be altered due to the fact that the previous speaker went over (or under) the allotted time.

Another all too common scenario is that a person may suddenly be asked by their boss, last minute, to present a five minute summary of their 30 minute presentation at a meeting that will be starting in a few minutes.

While internal business presentations may specify a time limit and still be somewhat tolerant of a slight overage, there are other presentations, such as business pitches, where a presenter has exactly a specified number of minutes (e.g., five minutes) to present and, at the end of the time interval, the presenter must be done no matter how much more material was left to present.

BRIEF SUMMARY

In one aspect of this disclosure, a computer based tool is disclosed for automatically generating a modified presentation of a specified presentation time based upon an original presentation of a longer presentation time than the specified presentation time. The tool includes one or more processors coupled to non-transient program and data storage, and a non-transient program executable by the one or more processors to cause the one or more processors to retrieve the original presentation comprising a plurality of slides, each having at least one element. A priority is assigned to each element within the plurality of slides and a speech rate is calculated based upon a speech sample obtained from a user. A presentation time associated with each element is determined based on the calculated speech rate. The modified presentation of the specified presentation time is generated based on the assigned priority of each element and the determined presentation time associated with each element, wherein higher priority elements are included in the modified presentation before lower priority elements.

In another aspect of this disclosure, a computer based tool is disclosed for automatically analyzing an original presentation having an original presentation timing length and producing a new presentation that fits within a specific modified presentation timing length. The tool includes one or more processors coupled to non-transient program and data storage and a non-transient program executable by the one or more processors to cause the one or more processors to retrieve a first presentation comprising at least two slides, each having at least two elements therein and individual priorities associated with the elements on an individual basis. The first presentation is analyzed to determine, for each of the at least two elements of the at least two slides, a presentation time associated with individual ones of the at least two elements. A second presentation that fits within the specific modified presentation timing length is automatically assembled, based upon the priority of each element, wherein higher priority elements are included before lower priority elements, and based upon individual element timing. The second presentation is output by the tool.

In yet another aspect of this disclosure, a computer based method for automatically producing a new presentation from an existing presentation includes retrieving a presentation having a delivery duration and comprising a sequence of slides. At least one of the slides includes at least two elements, each of the at least two elements having an associated designated priority. A specific presentation duration, different from the delivery duration, is identified to which the new presentation must conform, and a time duration is determined for each of the at least two elements. Based upon the associated designated priorities and determined time durations, one or more specific elements from the slides are selected from among the at least two elements, such that, collectively, the selected elements of a selected portion of the sequence of slides fits within the specific presentation duration. The new presentation is automatically generated based upon a result of the selected specific elements from the slides, the new presentation having a new delivery duration that fits within the specific presentation duration.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This disclosure provides a technical solution to generate a new presentation from an existing presentation that can fit within a specified presentation duration (different from the duration of the existing presentation), while minimizing loss of important content.

The technical solution described in this disclosure is implemented as an automated approach that involves using both the priority assigned to an element within a presentation, and the length of time it takes a user to present the element, to automatically produce a new presentation that fits within a specific presentation duration different from the original, existing presentation. To this end, FIG. 1 illustrates, in simplified form, a network capable of implementing the technical solution disclosed herein.

Figure 1:
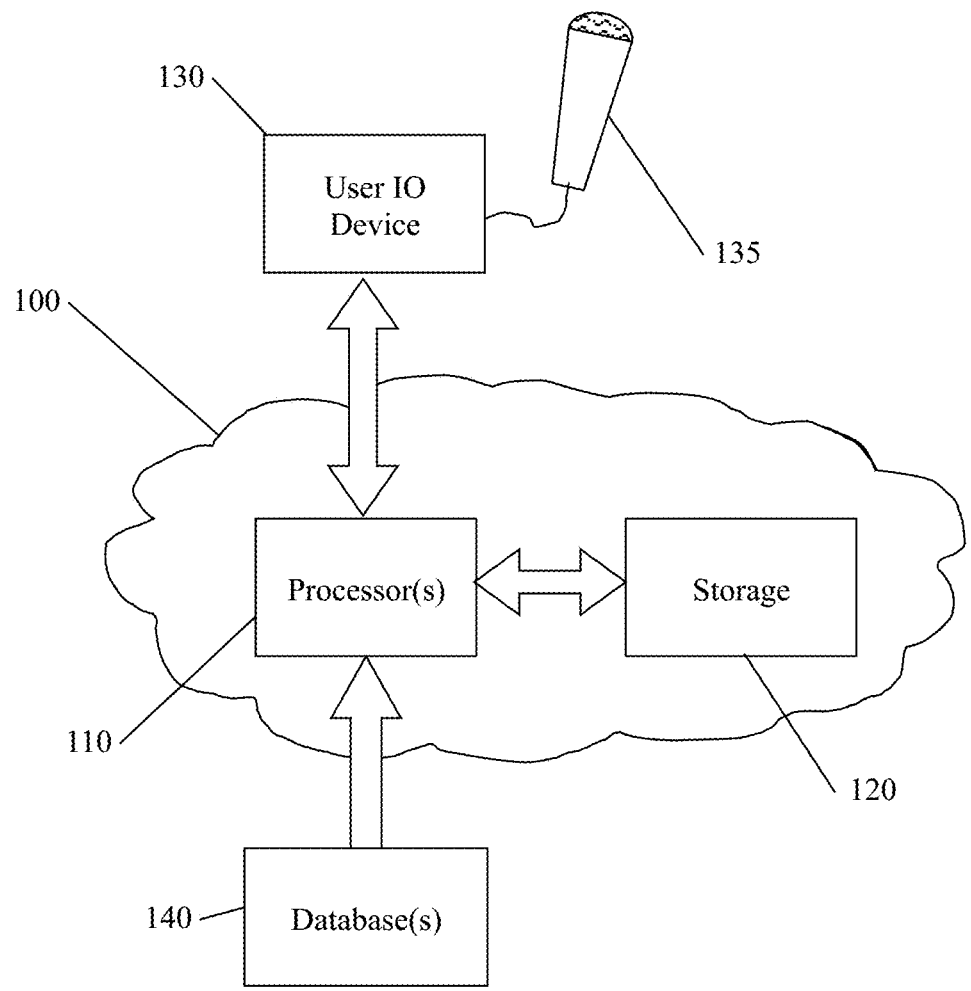
FIG. 1 illustrates, in simplified form, a network capable of implementing the technical solution described herein.

As can be seen in FIG. 1, the technical solution includes, as part of a network 100, one or more processors 110, coupled to non-transient program and data storage 120, that is configured to operate as described herein under the control of a non-transient program stored in the storage 120. Coupled to the network 100, and accessible by the one or more processors 110, is a user I/O device 130 (shown with an optional voice input 135 for input of speech) through which input can be provided, and one or more databases 140 into which a presentation and/or its elements, their associated timings and priorities are stored for later use in creating new presentations as described herein. Depending upon the particular implementation, the database(s) 140 can be part of a separate system constructed to operate as described herein or created as part of (and to interoperate with) a presentation-creation/editing program.

A general overview of the technical approach to automatically producing a new presentation from an existing presentation that fits within an allotted presentation length will now be provided, followed by a more detailed description of the components of the process and the process itself.

Individuals who use prepared presentations that take particular lengths of time to present often have to quickly modify them to fit specific different lengths of time. Typically, this involves a tremendous amount of manual work to both meet the specific time constraint and maximize the retained content, and can often only be accomplished through trial and error.

As described herein, the general technique herein provides a technical solution, which involves prioritizing elements making up the content of the presentation, analyzing the presentation and automatically including within a revised version of the presentation only those elements with the highest priority and then adding additional elements with lower levels of priority until all of the available allocated presentation time has been used.

Figure 2:
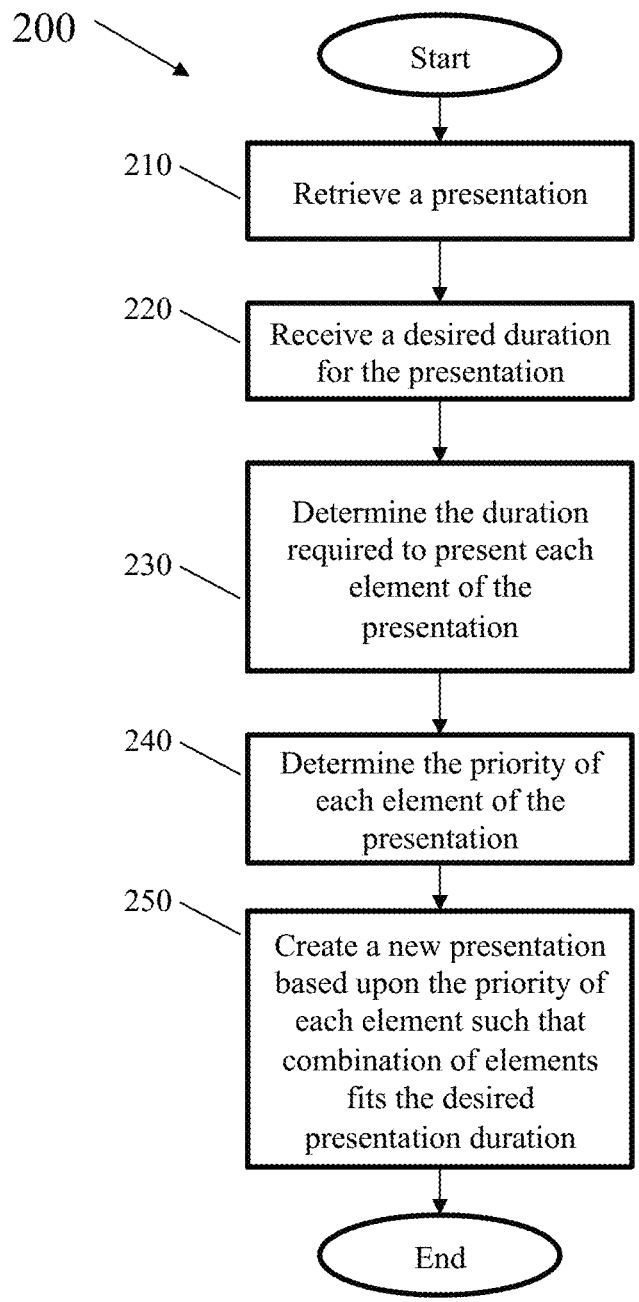
FIG. 2 illustrates, in simplified form, a representative overview process capable of implementing the technical solution described herein.

FIG. 2 illustrates, in simplified form, a representative overview process 200 capable of implementing the technical solution described herein. The process 200 includes retrieving a presentation and its associated, previously stored, element priority information (Step 210), receiving a desired time duration for the presentation (Step 220), determining the length of time required to present each element of the presentation (Step 230), determining the priority of each element of the presentation (Step 240), and creating a new presentation based upon the priority of each element such that combination of elements fits within the desired time duration for the presentation (Step 250).

The first two steps—retrieving a presentation (Step 210) and receiving a desired time duration for the presentation (Step 220)—involve receiving external input to be used in the subsequent steps to be taken.

With respect to determining the length of time required to present each element of the presentation (Step 230), there are numerous ways that this may be accomplished. What follows is a general discussion of specific representative techniques by which the length of time required to present an element of a presentation can be determined.

Prepared presentations that people give can be broken down into component parts (or elements). Representative example programs that can be used in creating, editing and delivering such presentations include Microsoft PowerPoint®, LibreOffice Impress, Lotus Freelance®, etc., through the creation of individual slides containing the presentation content in text, graphics or some combination thereof. Those components associated with a slide, such as Title, Main Heading, Sub-Heading, pictures and associated text, to name just a few, are referred to herein as the elements of a slide.

It should be noted that for presentations given over a teleprompter, such as a speech, a segment within a presentation and a slide are equivalent concepts, and within the segment are elements, which may, for example, be paragraphs or sub paragraphs related to a particular topic. For the purpose of this disclosure, a segment delivered over a teleprompter is equivalent to a slide and the term "slide" is intended to encompass both.

When making a presentation, using presentation software, the slides themselves are presented in a sequential order and the speaker accompanies that presentation with narration that relates to the content of the slides. In general, the more content that is on a particular slide, the longer a presenter normally spends on a particular slide. In some cases, presenters will maintain a transcript of the associated narration with (or within) the slides, particularly if the presentation will likely be used more than once. If the entire narration for the presentation is verbatim maintained with the slides (or constitutes the slides), then one approach that can be used to determine time duration is through calculating the number of syllables and pauses (comma, periods, paragraph marks, slide transitions, etc.) within the narration and presentation content and, using the rate at which the speaker speaks (syllabic as well as pause rates or more generally a word rate per minute), to determine the length of time for, not only the overall presentation, but also for the individual elements within the presentation.

The rate at which a presenter speaks can be determined based upon analyzing a representative speech sample from the presenter to determine a spoken word rate per minute or a rate based upon syllable generation as well as pauses. While a word or syllable count of a text passage multiplied by the spoken word rate per minute can be used to predict the time it would take a presenter to speak the text passage, the accuracy of this technique improves, and becomes more accurate, the longer the passage. For passages of mixed lengths, and for shorter passages in particular, it is advantageous to use the spoken rate based upon syllables in the passages, as well as pauses in combination with a syllabic dictionary, or other sources of information about the syllabic nature of words, in order to accurately predict the length of time it would take a presenter to speak a specific passage of text. To this end, some variants optionally include a microphone 135 to provide input via the User I/O Device 130 of FIG. 1. Other alternative options for determining a speech rate include incorporating modification settings, such as settings for fast, medium, and slow speed for a speaker, which could be based upon a typical prototypical presenter, or based upon the stored rate of a given user. For example, by speaking fast, a user may be able to reduce a 20 minute presentation by 15% or more, down to 17 minutes or less, whereas by speaking slower, a user may increase a 12 minute presentation to fill an allocated 15 minute time slot.

Aside from text-based elements, other elements are often also included in a presentation, such as (but not limited to): (i) pictures, which may be added to make the slide more visually appealing or may actually be discussed during the presentation; (ii) graphs, which are almost always discussed if included; and/or (iii) video/audio clips, which have timings associated with playing them already established or easily measured. In the case of (i) or (ii), an alternative and/or additional approach that can be used for obtaining timings associated with the individual elements in slides of a presentation, and the presentation as a whole, is to actually record the timing when a presenter gives, or is rehearsing, the presentation. Notably, if the presentation includes automation (e.g., clicking to make the next element appear), then the automation can be used to determine timings of the individual elements, and not just the slide as a whole. As a result, the length of time an individual element needs can be calculated by subtracting the length of time between subsequent elements appearing on a presentation timeline.

In still other situations where the timings are not otherwise already associated with individual elements or easily calculated based upon the rate, the timings can be predicted based upon aspects of the presentation themselves. For example, pictures and other non-text based elements that are smaller than a certain size, take up less than a particular percentage of the slide's area, or are located on the periphery of a slide, could be assumed to be simply visual, whereas centrally located elements and larger elements could be assumed to require some presentation time to be allocated. The presentation time allotted to that element could be set based upon standard times associated with that type of element (e.g., each picture gets allocated 40 seconds) or the content of the rest of the slide may be taken into account in combination with that element's position with respect to that content. For example, a slide with a picture that is beside, or otherwise appears with, one or more bullet points may only get an additional 15 seconds allocated for its timing. Additionally, the type of non-textual element may also be taken into account, for example, so that graphs are allocated more time than pictures. Additionally, or alternatively, the complexity and level of detail within the non-text element may also be taken into account, for example, a table versus a graph based upon the table's data content.

Still other alternative, but less desirable, techniques can include simply receiving a total time-length value for the existing presentation and then evenly allocating it among the slides, and then evenly sub-allocating part of that slide time to each element within the slide.

Thus, with respect to the step, in FIG. 2, of determining the length of time required to present each element of the presentation (Step 230), it should be understood that the techniques mentioned above are a few representative examples of multiple various techniques that can be used to associate duration with a presentation element, and are provided merely for purposes of understanding. It is to be understood that other techniques can be used to associate a duration with a presentation element, the important aspect being the approach providing the ability to establish an overall presentation duration and/or the length of time to be allocated for presentation of an element, not the particular algorithm or protocol used to do so.

Returning to FIG. 2, in addition to determining and storing the time required to present each element (Step 230), the priority of each element of the presentation is determined (Step 240), at which point all of the information necessary will have been obtained in order to create a new presentation, by including or excluding elements, based upon the priority of each element such that the combination of elements fits the desired presentation length (Step 250).

In order to create a presentation based upon priority, the priority associated with each element of the presentation needs to be determined (Step 240). This can be performed by simply looking up, for example, in a related table, the previously stored priority values for the elements making up the content as specified by the creator, presenter or user. Alternatively, or additionally, the priority can be determined automatically based upon attributes of the data element, such as (but not limited to): (i) the type of element (e.g., text, graphs and video have priority in that order and all have a higher priority than non-text elements, pictures and audio clips); (ii) functional attributes of the element (e.g., title, heading, topic and bullet, all having a higher priority than subtitle, subheading, subtopic and sub-bullet); (iii) visual attributes of the element (e.g., elements comprising larger sized fonts, bold text, underlined text, text of darker color than the default text color, etc., are given a higher priority than, for example, smaller font sizes, regular text, italic, text in the default color, and text in a color lighter than the default text on that (or some other) order); (iv) associational attributes (e.g., text associated with a graph element will be given a higher priority than a table (and its corresponding text) on the same slide that is associated with the graph); and/or (v) the time required to present an element (e.g., longer time-allocated elements are considered higher priority than shorter timed elements). Other optional alternatives include (but are not limited to) using default or predefined priorities built into a predefined template that a presenter or user utilizes to create the presentation or a template or form that requires presenters or users to assign priorities as part of the presentation creation process.

In this regard, it should be understood that the above methods by which priority of a presentation element can be determined are intended as merely representative methods for purposes of understanding. It is to be understood that any other methods by which priority of a presentation element can be determined can be used to the same or similar effect, again, the important aspect being the ability to specify or determine the priority for each element and not the particular method or protocol used.

Having established (and, as necessary, stored) the priority, in FIG. 2, a new presentation can be created based upon the priority of each element (Step 250), which involves using the aforementioned element timing and priority information to determine the combination of elements that fit within the allotted time for the new presentation.

The simplest approach is to start assembling a new presentation by initially including all the highest priority elements, sorted (ideally in original presentation slide order), and comparing their combined total associated time to the new allotted time and, if there is additional time available, to keep adding lower priority elements (ideally in slide order) until the allotted time is filled.

Figure 3:
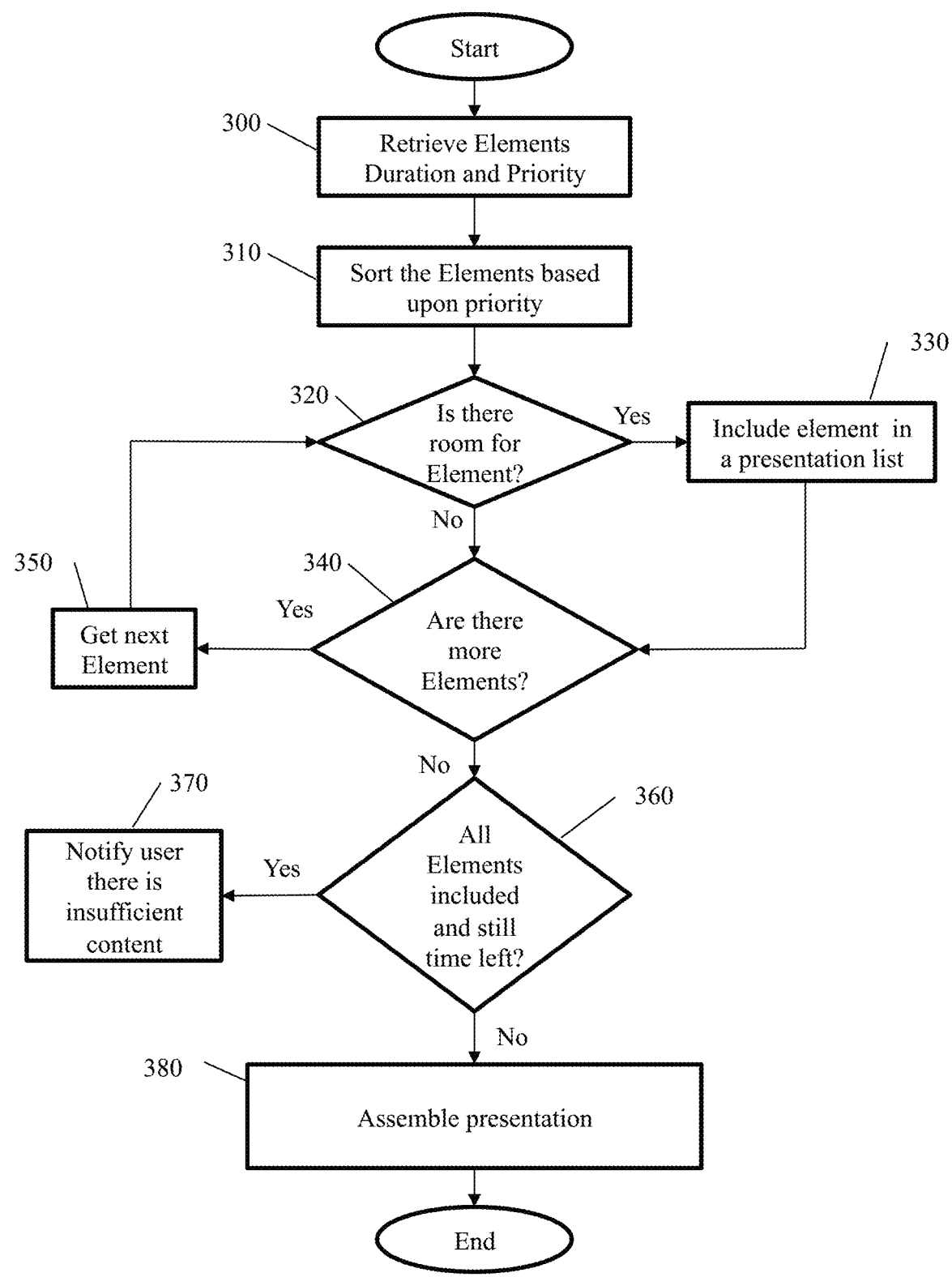
FIG. 3 illustrates in, in simplified form, a process for a new assembling a presentation based upon the priorities assigned to each element of the presentation.

FIG. 3 illustrates, in simplified form, a process for assembling a presentation based upon the priority comprising: retrieving the elements, and their associated duration and priority from an element database 140 (Step 300); sorting the elements into a sequence based upon their priority and, ideally, slide order (Step 310); determining, for each of the highest priority element(s), whether there is enough room for those elements (Step 320) and, if so, including the element in a presentation list (Step 330) from which the new presentation will be built and, if not, then getting the next element in the sequence (Step 350) until all the elements of that priority, and subsequently lower priorities thereafter, have been tested; then determining whether or not all the elements from the original presentation have been included and whether there is still time left (Step 360) and, if so, notifying the user that there is insufficient content (Step 370) and, if not, assembling the presentation according to the presentation list (Step 380) using the actual elements from the element database 140.

The process specified in FIG. 3 can be used to effectively assemble a presentation, especially when all of the elements have different priorities and elements do not depend from other elements. However, when elements have the same priority or depend from other elements, then additional rules can be employed in determining which elements go into the presentation list if there is a conflict that does not allow inclusion of them all.

For example, with respect to elements having the same priority, the step of sorting the elements based upon priority (Step 310) could include, as an alternative or in addition to, using slide order, a secondary sort by duration. If the secondary sort puts the elements with the longest duration first (based on the assumption that longer durations indicate more important elements), then these elements will always be tested before other elements of the same priority. Alternatively, if the secondary sort puts the elements with the shortest duration first, then this will result in the maximum number of elements of the same priority being included. In more sophisticated variants configured for ensuring that the elements included represent the "best fit" to the allotted time, maximization algorithms can be employed. For example, if there were four elements A, B, C, and D, each with the following associated times (in minutes): A=3, B=4, C=7, and D=8, and the remaining available presentation time was 10 minutes, then sorting by largest first would place only element D in the presentation list with 2 minutes remaining available, whereas sorting by smallest first would place two elements A and B in the presentation list and leave 3 minutes remaining available, while using maximization algorithms could produce the closest fit to the 10 available minutes and would mean that elements A and C were included in the presentation list with 0 minutes of time remaining available.

When elements do depend from other elements, for example, in a parent/child relationship (often indicated in a presentation or outline format through indenting or other means), then, assuming the child does not have a higher priority value (in which case the child would have been tested for inclusion prior to the parent using the process in FIG. 3), rules could be setup to determine whether or not to include the child if the parent has been excluded from the presentation list.

Figure 4:
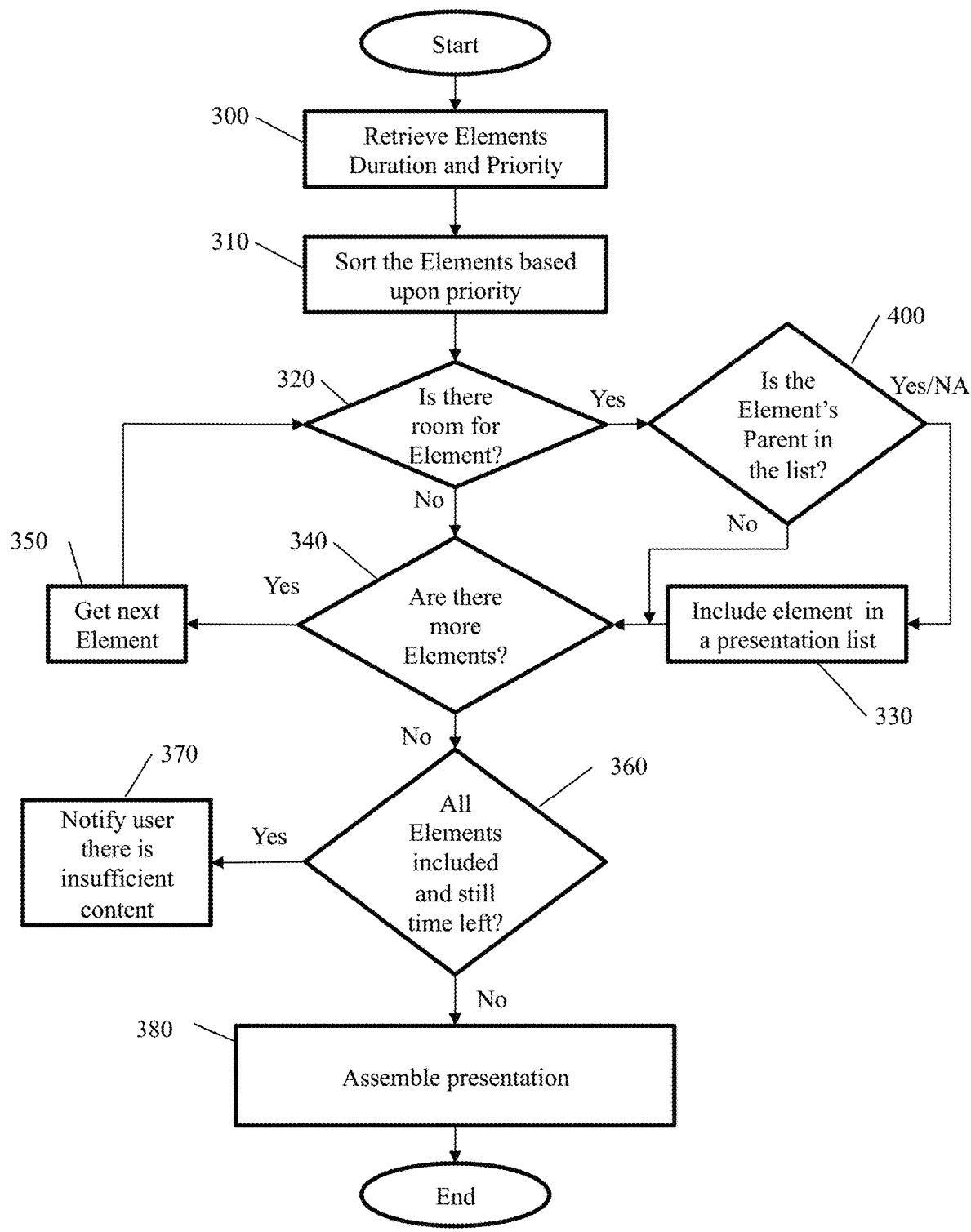
FIG. 4 illustrates, in simplified form, a modified version of the process of FIG. 3.

For example, FIG. 4 illustrates, in simplified form, a variant containing a modification to the process of FIG. 3 designed to exclude children without parents. Specifically, a test of whether or not the element's parent is in the presentation list (Step 400) has been added between the steps of testing if there is enough room (in terms of time) for inclusion of the element (Step 320) and the step of including the element in a presentation list (Step 330). As a result, a child element would only be added if the parent was already in the list (or it is not applicable such as an element not having a parent).

At this point, it should be understood that the approaches presented are representative approaches to combining the elements of a presentation to fit within the allotted time presented for purposes of understanding. It is to be understood that other approaches to combining the elements of a presentation to fit within the allotted time can be used to the same or similar effect for creating a presentation that fits within a specific length of time, again, the important aspect being the ability to automatically create a new presentation by including or excluding elements of an original presentation according to an automated protocol incorporating both timing and priority such that the new presentation fits within a specific length of time while also minimizing the exclusion of important content, not the particular approach or protocol used.

Once it has been determined which elements will be used to produce a new presentation that fits within a desired time frame, as contained within the presentation list, the system (tool) can automatically produce the presentation or, in some variants, output the new presentation as a draft set of slides for review and potential manual adjustment by the user or presenter.

Depending upon the particular implementation, the creation of the new presentation from the presentation list can include excising the material to be deleted from the existing slides, or, for more sophisticated implementation variants, consolidating slides on the basis of certain specified rules, for example, where sub-elements on two adjacent slides are subordinate to the same parent element, they can be consolidated onto a single slide if space permits, or if sub-elements of a parent element span three or more slides, they could be divided evenly among the slides.

Figure 5:
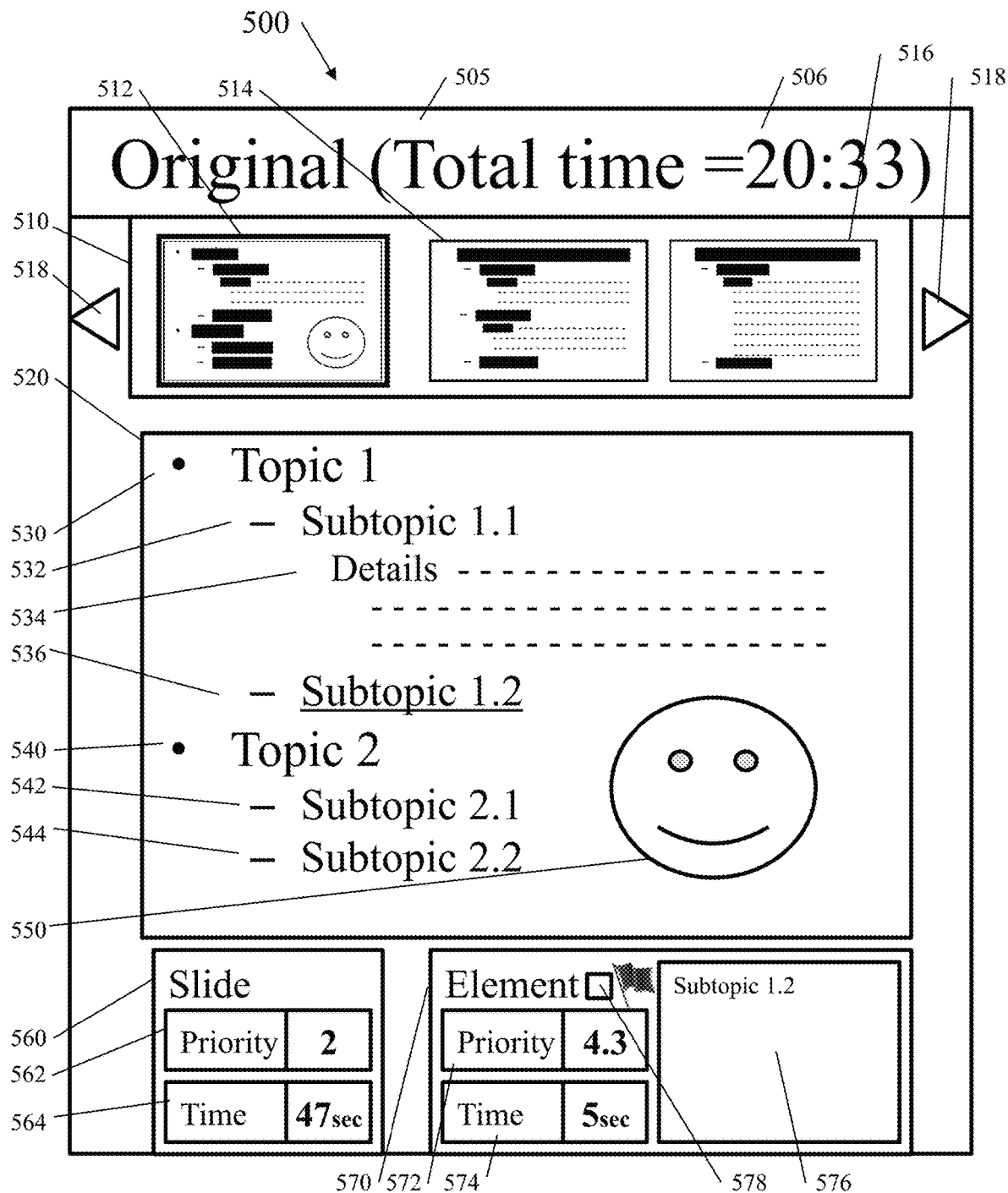
FIG. 5 illustrates, in simplified form, a representative format for reviewing a modified presentation.

FIG. 5 illustrates, in simplified form, a representative format for an optional interface that allows the reviewing of both an original and a modified presentation, and which incorporates being able to review changes and adjust priorities and then have the tool recalculate, generate or create a new presentation based upon those changes.

Within the display 500 of FIG. 5 is an area 560 that has two status indicators 562, 564 that display information for a selected slide: one indicator 562 for showing the slide's Priority, which, in this example, is shown as having a priority of "2," and the other indicator 564 showing the determined Time for the selected slide 512, which currently is shown as having a value of 47 seconds. It should be noted that, while in this sample display, lower numbers are considered as indicating a higher priority for the slides or elements within the presentation, the opposite could also be true (as could the use of any other indicator, such as a letter, color or slider setting, for example), the important aspect being the indication of a relative priority for the slide or element, not the particular manner in which that priority is indicated.

The example display 500 in FIG. 5 includes: a time status window 505, which shows that the original presentation with a total presentation time of 20 minutes and 33 seconds; a slide selector area 510, which, in this example, shows three reduced-size slides 512, 514, 516 and includes arrows 518 that allow for scrolling through the slides making up the presentation. Selecting a specific slide within the area 510 highlights that slide as the current slide 512 and causes a larger view of the selected slide 512 to be displayed in a slide display area 520 below the slide selector area 510. Below that slide display area 520 are two areas 560, 570, respectively, showing Priority 562 and presentation Time 564 for the selected slide 512 and, if selected within the enlarged slide area 520, similarly the Priority 572 and Time 574 for any selected element 570 of the slide 512, as indicated in the larger view within the slide display area 520 (as shown in FIG. 5 by underlining).

As shown in the example of FIG. 5, within the larger view 520 of the selected slide 512 are two major elements 530, 540, which have the bullet pointed text "Topic 1" and "Topic 2" and an element 550 made up of a picture. Below the first element 530, labeled "Topic 1" are two sub-elements 532, 536 to the first element 530, one of which is the text "Subtopic 1.1" which itself has a further sub-element 534, shown as a details section, represented for illustration purposes by the initial word "Details" and a series of dashes. The other sub-element 536 to the first element 530 is the text "Subtopic 1.2". As shown, the underlining of this sub-element 536 is indicating that it is the currently selected element of this slide 512 and, as a result, its information also appears in the selected element area 570. Likewise, below the second major element 540 of this slide 512 are two sub-elements 542, 544, respectively containing the text "Subtopic 2.1" and "Subtopic 2.2".

Within the display 500 is the selected element area 570 which, as shown, has three status indicators 572, 574, 576: one indicator 572 for showing the Priority of the selected element 536, which in this case, is shown as having a priority of "4.3"; one indicator 574 for showing the currently determined Time for the selected element 536, which currently is shown as having a value of "5 sec"; and a content window 576 for displaying the content of the selected element 536.

In addition, the selected element area 570 optionally includes a check box 578 that can be used to "flag" an element for mandatory inclusion in a presentation, irrespective of its time and/or priority.

Now, for purposes of example illustration, presume that it is desired by a presenter that the presentation of FIG. 5 be converted, based upon priority, from its currently determined time of 20 minutes and 33 seconds into a presentation that takes exactly 5 minutes and 0 seconds. This could be accomplished by indicating an intent to modify. Depending upon the particular interface implementation, such intent could be indicated by selecting an item from a menu or a displayed button, pressing one or more particular key(s) of a keyboard, or by some other means, for example, if a mouse or stylus is used as an input device, by clicking or pressing within the time status window 505.

Figure 6:
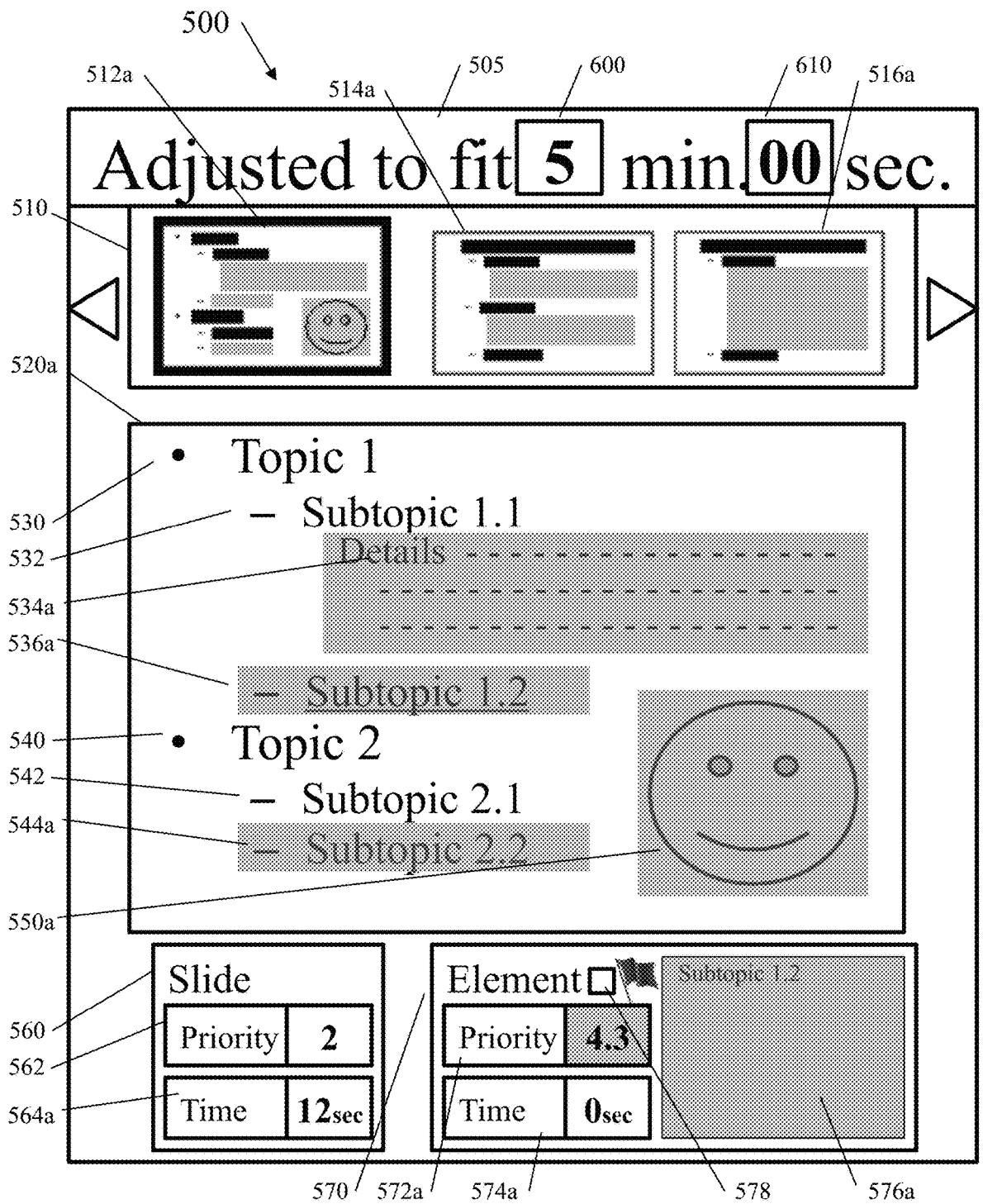
FIG. 6 illustrates, in simplified form, a modified version of the presentation of FIG. 5 for the purpose of reviewing and approving the changes.

FIG. 6 illustrates, in simplified form, the example display 500 after it has been indicated that a modified version of the presentation of FIG. 5 was to be created, and has been created to fit within the allotted time period. As shown in FIG. 6, that modified version of the original presentation is shown in the display 500 for the purpose of the user reviewing and approving the changes.

In FIG. 6, since a modified version of the presentation is displayed, the status 505 now reads, "Adjusted to fit 5 min. 00 sec." where the boxes 600, 610 for the number of minutes and the number of seconds allow for the new time to be supplied by the user for purposes of generating a modified presentation according to the designated priorities, or, since the modified presentation as shown here, for display of that previously-supplied allotted time.

Thus, within the slide selector area 510, are now modified versions 512a, 514a, 516a of the three original slides 512, 514, 516 shown in FIG. 5, with the current modified slide 512a being highlighted and the grayed out areas of each modified slide 512a, 514a, 516a indicating proposed content for removal in creating the modified presentation having a presentation duration of 5 minutes, 0 seconds.

Within the larger view 520a, certain elements 534a, 536a, 544a, 550a of the slide 512a are likewise shown grayed out, indicating that they are to be removed in creating the modified presentation, specifically, in this example, the elements designated for removal are: the Details sub-element 534a, the sub-element 536a with the text "Subtopic 1.2", the sub-element 544a with the text "Subtopic 2.2", and the picture 550a. Note here that, although a particular element is indicated by the graying (or other color or visual indicator) as being destined for deletion in the new presentation, it can still be selected, such as shown by the underlining of the sub-element 536a (made up of the text "Subtopic 1.2"). Advantageously, as mentioned above, this allows the details of that element 536a to still be displayed in the selected element area 570 (albeit with the Priority value in the indicator 572a and content window 576a being likewise grayed out to further indicate intended deletion) so the user can have the option to override the specified deletion in some manner, for example, by changing the value in the Priority indicator 572a or checking the check box 578 to require this element 536a be included in the new presentation.

As result of the approach described above that modified the original presentation based upon priority, it can now be seen that the slide's Time indicator 564a value has now been reduced from 47 seconds (in FIG. 5) down to 12 seconds (in FIG. 6) and that the element's Time indicator 547a value has been reduced from 5 seconds (in FIG. 5) down to 0 seconds (in FIG. 6), since this is an element selected for deletion based upon its Priority 572 value of "4.3."

The reviewer of the presentation could then, for example, choose to modify the Priority indicator 572a value of the selected element or select the check box 578, thereby respectively affecting its potential inclusion relative to some other element(s) or forcing this element to be included irrespective of priority setting and/or time. Upon doing so, the system (tool) can then automatically adjust the presentation using the new setting(s) and produce another modified presentation for review.

This application has been described above with reference to flow chart illustrations and/or block diagrams of methods, apparatus (systems) and computer program products according to one or more embodiments. It is understood that some or all of the blocks of the flow chart illustrations and/or block diagrams, and combinations of blocks in the flow chart illustrations and/or block diagrams, can be implemented by computer program instructions. The computer program instructions may also be loaded onto the computing system to cause a series of operational steps to be performed on the computer to produce a computer implemented process such that the instructions that execute on the computer provide processes for implementing the functions/acts specified in the flowchart and/or block diagram block(s). These computer program instructions may be provided to the CPU of the computing system such that the instructions, which execute via the CPU of the computing system, create means for implementing the functions/acts specified in the flowchart and/or block diagram block(s).

These computer program instructions may also be stored in a non-transient computer-readable medium that can direct the computing system to function in a particular manner, such that the instructions stored in the computer-readable medium implement the function/act specified in the flowchart and/or block diagram block or blocks. Any combination of one or more computer usable or computer readable medium(s) may be utilized. The computer-usable or computer-readable medium may be, for example (but not limited to), an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory, a read-only memory, an erasable programmable read-only memory (e.g., EPROM or Flash memory), an optical fiber, a portable compact disc read-only memory, an optical storage device, a transmission media such as those supporting the Internet or an intranet, or a magnetic storage device. Any medium suitable for electronically capturing, compiling, interpreting, or otherwise processing in a suitable manner, if necessary, and storing into computer memory may be used. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base band or as part of a carrier wave. The computer usable program code may be transmitted using any appropriate medium, including (but not limited to) wireless, wire line, optical fiber cable, RF, etc.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A computer program product for automatically generating a modified presentation of a specified presentation time based upon an original presentation of a longer presentation time than the specified presentation time, the computer program product comprising a non-transient computer readable medium having program instructions embodied therein, the program instructions executable by a processor to perform a method comprising:
   providing the original presentation comprising two or more slides, the two or more slides comprising a plurality of elements of one or more component types, the plurality of elements comprising a hierarchy including one or more child elements, each of which is descended from a parent element;
   assigning a priority to each element within the plurality of elements, based at least in part on a visual or functional attribute associated with a component type of the element;
   analyzing a representative speech sample from a user to calculate a speech rate for the user based on syllable generation and pauses in the speech sample;
   determining a presentation time associated with each element, wherein the presentation time of at least one element is based on predicting a length of time to speak text passages using the text passages and the calculated speech rate; and
   automatically generating the modified presentation of the specified presentation time based on the assigned priority of each element and the determined presentation time associated with each element, wherein, for each component type, higher priority elements of the component type are included in the modified presentation before lower priority elements of the component type, wherein at least one parent is excluded, wherein children elements descending from the excluded parent element are automatically excluded based on exclusion of the parent element.

2. The computer program product of claim 1, wherein the visual or functional attribute of the element is whether the element is a title, subtitle, heading, subheading, topic, sub-topic, bullet, or sub-bullet.

3. The computer program product of claim 1, wherein the visual or functional attribute of the element is a font color, font size, or font styling of the element.

4. The computer program product of claim 1, wherein the visual or functional attribute of the element is association of the element with another element.

5. The computer program product of claim 1, wherein the visual or functional attribute of the element is a size or area of a non-textual element.

6. A computer program product for automatically analyzing an original presentation having an original presentation timing length and generating a new presentation that fits within a specific modified presentation timing length, the computer program product comprising a non-transient computer readable medium having program instructions embodied therein, the program instructions executable by a processor to perform a method comprising:
   providing a first presentation comprising at least two slides, each having at least two elements therein;
   analyzing the first presentation to determine, for each of the at least two elements of the at least two slides, a presentation time associated with individual elements of the at least two elements, wherein the analyzing includes retrieving a speech sample and calculating a speech rate relative to the first presentation based on syllable generation and pauses in the speech sample and predicting a length of time to speak text passages using the text passages and the calculated speech rate;
   determining a priority for each of the at least two elements, based at least in part on a visual or functional attribute of the element associated with a component type of the element;
   based upon the priority of each element, and based upon individual element timing, automatically assembling a second presentation that fits within the specific modified presentation timing length, wherein at least one element included in the second presentation is a child element and is moved to a slide on which another child element of a same parent element is present and which is a different slide from a slide that the at least one element was part of in the first presentation; and
   output the second presentation.

7. The computer program product of claim 6, wherein the method further comprises:
   displaying the second presentation for one or more of modification or approval.

8. A computer program product for automatically generating a new presentation from an existing presentation, the computer program product comprising a non-transient computer readable medium having program instructions embodied therein, the program instructions executable by a processor to perform a method comprising:
   providing the existing presentation having a delivery duration and including a sequence of slides, at least one of the slides including at least two elements, each of the at least two elements having a same component type and a different visual or functional attribute associated with the same component type;
   identifying a specific presentation duration, different from the delivery duration, to which the new presentation must conform;
   determining a time duration for each of the at least two elements;
   based upon the determined time durations and upon a priority based at least in part on the distinct visual or functional attribute, selecting from among the at least two elements, one or more specific elements from the slides such that, collectively, the selected elements of a selected portion of the sequence of slides fits within the specific presentation duration; and
   automatically generating the new presentation, based upon a result of selecting one or more specific elements from the slides, the new presentation having a new delivery duration that fits within the specific presentation duration, wherein determining the time duration for each of the at least two elements is based upon predicting a length of time to speak text passages using the text passages and a user speech rate, and wherein the user speech rate is calculated based on syllable generation and pauses in a speech sample obtained from a user.

9. The computer program product of claim 8, further comprising displaying the new presentation for review prior to finalizing the new presentation.

10. The computer program product of claim 8, wherein the method further comprises:
   allowing a reviewer to select an individual element and either
      i) modify its priority, or
      ii) mandate its inclusion in the new presentation.

11. The computer program product of claim 8, wherein the different visual or functional attribute between the at least two elements is a distinction between a title and subtitle, heading and subheading, topic and subtopic, or bullet and sub-bullet.

12. The computer program product of claim 8, wherein the different visual or functional attribute is a different font color, font size, or font styling between the at least two elements.

13. The computer program product of claim 8, wherein the different visual or functional attribute between the at least two elements is a difference in component type between an element associated with one of the at least two elements, and an element associated with another of the at least two elements.

* * * * *